United States Patent
Noridomi et al.

(10) Patent No.: US 10,706,301 B2
(45) Date of Patent: Jul. 7, 2020

(54) DETECTION DEVICE, LEARNING DEVICE, DETECTION METHOD, LEARNING METHOD, AND RECORDING MEDIUM

(71) Applicant: Panasonic Intellectual Property Management Co., Ltd., Osaka (JP)

(72) Inventors: Shuzo Noridomi, Aichi (JP); Koji Arata, Kanagawa (JP)

(73) Assignee: PANASONIC INTELLECTUAL PROPERTY MANAGMENT CO., LTD., Osaka (JP)

( * ) Notice: Subject to any disclaimer, the term of this patent is extended or adjusted under 35 U.S.C. 154(b) by 93 days.

(21) Appl. No.: 15/911,241

(22) Filed: Mar. 5, 2018

(65) Prior Publication Data
US 2018/0285667 A1    Oct. 4, 2018

(30) Foreign Application Priority Data
Mar. 31, 2017    (JP) .................................. 2017-070739

(51) Int. Cl.
*G06K 9/00*    (2006.01)
*G06T 7/11*    (2017.01)
*G06T 7/73*    (2017.01)
*G06K 9/66*    (2006.01)

(52) U.S. Cl.
CPC ..... *G06K 9/00845* (2013.01); *G06K 9/00228* (2013.01); *G06K 9/66* (2013.01); *G06T 7/11* (2017.01); *G06T 7/74* (2017.01); *G06T 2207/20081* (2013.01); *G06T 2207/30201* (2013.01); *G06T 2207/30268* (2013.01)

(58) Field of Classification Search
CPC ............................................ G06T 2207/30201
See application file for complete search history.

(56) References Cited

U.S. PATENT DOCUMENTS

| | | | |
|---|---|---|---|
| 2006/0187305 A1* | 8/2006 | Trivedi | G06K 9/00234 348/169 |
| 2017/0032201 A1* | 2/2017 | Bieg | B60W 40/08 |
| 2018/0025240 A1* | 1/2018 | Klement | G06K 9/00845 348/47 |
| 2018/0126901 A1* | 5/2018 | Levkova | G06K 9/00597 |
| 2019/0213429 A1* | 7/2019 | Sicconi | G06F 3/167 |

FOREIGN PATENT DOCUMENTS

JP    2016-057839    4/2016

* cited by examiner

*Primary Examiner* — Oneal R Mistry
(74) *Attorney, Agent, or Firm* — Greenblum & Bernstein, P.L.C.

(57) ABSTRACT

A detection device includes an image segmenter and a detector. The image segmenter cuts out a first region image and a second region image from an image of a vehicle interior that is acquired from an imaging device. The first region image shows at least a portion of a first part of a body of an occupant. The second region image shows at least a portion of a region of the vehicle interior around the first part or at least a portion of a second part of the body of the occupant. The detector detects an orientation of the first part of the body of the occupant based on a feature amount of the first region image and a feature amount of the second region image.

14 Claims, 11 Drawing Sheets

DETECTION DEVICE, LEARNING DEVICE, DETECTION METHOD, LEARNING METHOD, AND RECORDING MEDIUM

BACKGROUND

1. Technical Field

The present disclosure relates to a detection device, a learning device, a detection method, a learning method, and a recording medium storing a detection program or a learning program.

2. Description of the Related Art

Techniques for estimating the condition of an occupant in a vehicle based on an image taken by an imaging device have attracted attention in recent years. The orientation of the face of the occupant is particularly an important factor in detecting the occupant taking eyes off the road ahead, and various researches have been conducted about the head pose.

For example, Japanese Patent Unexamined Publication No. 2016-57839 (hereinafter referred to as Patent Literature 1), it is determined whether or not major elements of the face of a driver who may be in an eyes-off-road condition can be identified. From the determination result, it is determined whether or not a head pose angle of the driver is within a predetermined angle range (detection range) centered about the front direction. If it is determined that the head pose angle is outside the detection range, the head pose angle is estimated from an angular velocity indicating a immediately recent movement of the facial region and an elapsed time after the driver's head pose angle gets out of the predetermined angle range.

SUMMARY

The present disclosure provides a detection device, a learning device, a detection method, a learning method, and a recording medium storing a program that make it possible to accurately detect the orientation of a body part of an occupant who carries out a turn-back action.

A detection device according to an aspect of the present disclosure includes an image segmenter and a detector. The image segmenter cuts out a first region image and a second region image from an image of a vehicle interior that is acquired from an imaging device. The first region image shows at least a portion of a first part of a body of an occupant. The second region image shows at least a portion of a region of the vehicle interior around the first part or at least a portion of a second part of the body of the occupant. The detector detects an orientation of the first part of the body of the occupant based on a feature amount of the first region image and a feature amount of the second region image.

A learning device according to an aspect of the present disclosure includes an image segmenter and a learning model generator. The image segmenter cuts out a first region image and a second region image from an image of a vehicle interior that is acquired from a first data provision device. The first region image shows at least a portion of a first part of a body of an occupant. The second region image shows at least a portion of a region of the vehicle interior around the first part or at least a portion of a second part of the body of the occupant. The learning model generator generates a learning model that learns a correlation between an orientation of the second part acquired from a second data provision device and a feature amount of the first region image and a correlation between the orientation of the second part acquired from the second data provision device and a feature amount of the second region image.

It is also possible that the operations of the detection device and the learning device may be performed as a detection method and a learning method, respectively. It is also possible to provide a recording medium storing a program that causes a computer to perform the detection method or the learning method.

The present disclosure makes it possible to detect the orientation of a body part of an occupant who carries out a turn-back action accurately.

DETAILED DESCRIPTION OF PREFERRED EMBODIMENTS

Problems with conventional technology will be described briefly prior to describing exemplary embodiments of the present disclosure. The technique proposed in Patent Literature 1 requires that the contents of the process should be changed between a time when the head pose is within the detection range and a time when it is outside the detection range. Moreover, when the head pose shifts from an orientation within the detection range to an orientation outside the detection range through an abrupt head pose change, the head pose change is so large between the image frames, so that it is impossible to accurately calculate the angular velocity. For these reasons, the technique proposed in Patent Literature 1 may not be able to calculate the head pose in a stable manner.

Hereinafter, exemplary embodiments of the present disclosure will be described in detail with reference to the drawings.

(Configuration and Operation of Orientation Detection System 100)

Figure 1:
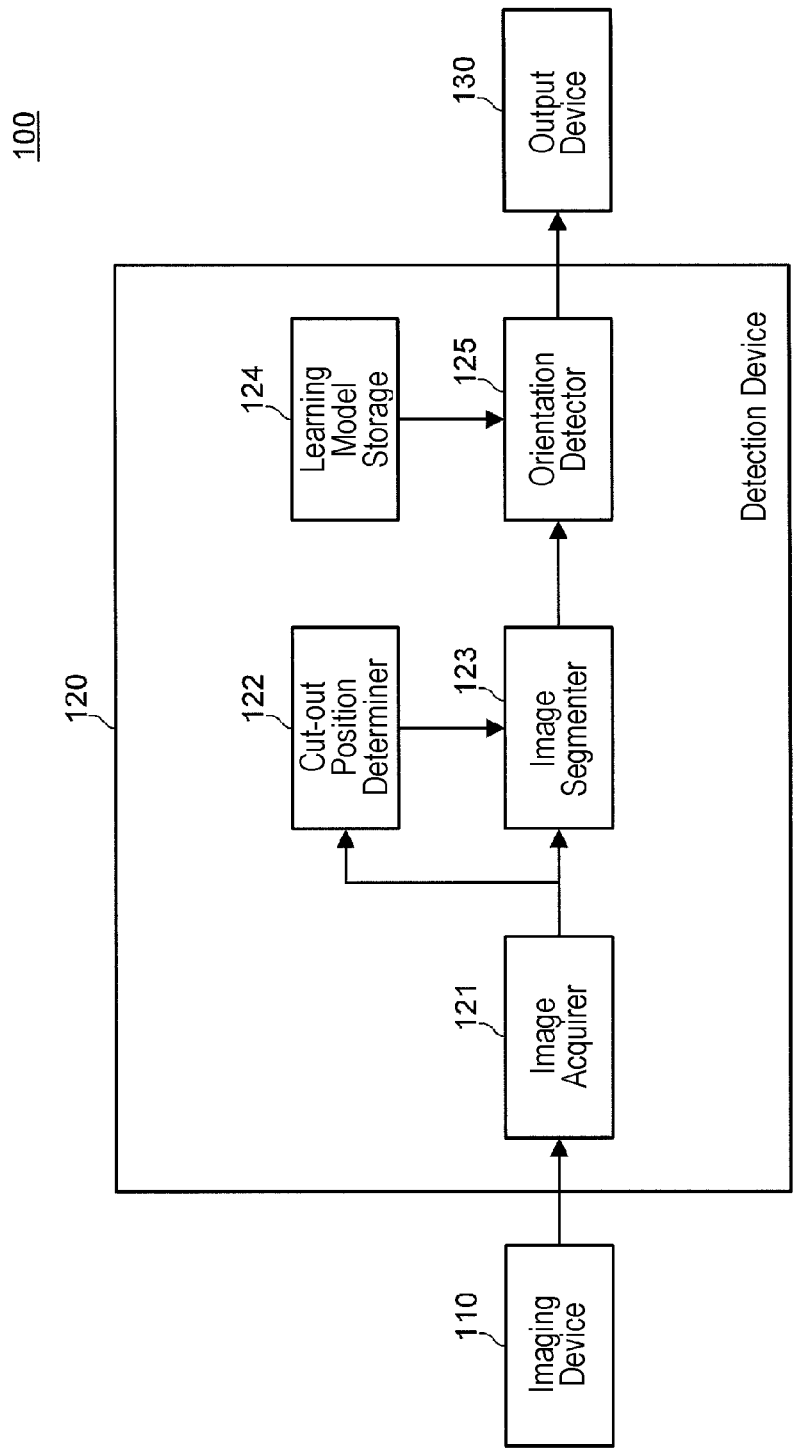
FIG. 1 is a functional block diagram illustrating the configuration of an orientation detection system including a detection device according to an exemplary embodiment of the present disclosure.

FIG. 1 is a configuration diagram of orientation detection system 100 according to the present exemplary embodiment. Orientation detection system 100 includes imaging device 110, detection device 120, and output device 130.

Imaging device 110 takes an image of a vehicle interior. Herein, the image of the vehicle interior is an image in which a region containing a first region and a second region is imaged. The first region includes at least a portion of a first part of a body of an occupant (such as a driver) of the vehicle. The second region includes at least a portion of a region of the vehicle interior around the first part or at least a portion of a second part of the body of the occupant. In other words, the first region image shows at least a portion of the first part of the body of the occupant. The second region image shows at least a portion of the region of the vehicle interior around the first part, or at least a portion of the second part of the body of the occupant. The first part of the body of the occupant is, for example, a face or a head. The region of the vehicle interior is, for example, at least one of a seat, a headrest, a vehicle window, and a pillar. The second part is, for example, at least one of a shoulder, a chest, and an upper body.

For example, imaging device 110 includes a passive detector capable of detecting light from an external light source, such as sunlight, and reflection of electromagnetic waves, sound waves, and the like. The passive detector may be, for example, one of a charge-coupled device (CCD) image sensor and a metal-oxide-semiconductor (MOS) image sensor, both of which can receive visible light.

Detection device 120 detects an orientation of the first part of the body of the occupant based on the image of the vehicle interior taken by imaging device 110. Detection device 120 includes image acquirer 121, cut-out position determiner 122, image segmenter 123, learning model storage 124, and orientation detector (detector) 125.

Image acquirer 121 acquires an image of the vehicle interior taken by imaging device 110 and outputs the acquired image to cut-out position determiner 122 and image segmenter 123.

Cut-out position determiner 122 determines a first region and a second region in the image of a vehicle interior that is output from image acquirer 121.

For example, cut-out position determiner 122 determines a region that corresponds to the first part of the body from the image of the vehicle interior, and determines the corresponding region to be the first region. The first region may be in a rectangular shape, for example. The region corresponding to the first part may be determined, for example, using known body-part recognition techniques, such as face recognition techniques employing Haar-like features or Gabor features. Alternatively, cut-out position determiner 122 determines a region corresponding to a predetermined portion in the image of the vehicle interior to be the first region.

For example, cut-out position determiner 122 determines the second region based on the first region. For example, the center of the second region is in agreement with the center of the first region. For example, the second region may be a rectangular-shaped region that is larger by a predetermined number of pixels both vertically and horizontally than the first region. In this case, the second region contains the first region therein. Alternatively, the second region may be a region in which the first region is excluded from a rectangular region that is larger by a predetermined number of pixels both vertically and horizontally than the first region.

Image segmenter 123 cuts out the first region image and the second region image from the image of the vehicle interior that is output from image acquirer 121 based on the first region and the second region determined by cut-out position determiner 122. Image segmenter 123 outputs the first region image and the second region image, which have been cut out, to orientation detector 125.

The first region and the second region are not limited in any way, as long as the feature amounts (quantities) of the first region image and the second region image, which are cut out by image segmenter 123, are correlated with the orientation of the second part. The details of the correlation will be described later with reference to FIGS. 6A to 6C. The feature amount of a region image may be, for example: a positional relationship between facial landmarks, such as eyes, nose, and mouth; an area of an exposed portion in the region of the vehicle interior; or a quantified value of shade variation, gradient direction, or the like in the region image. Here, the exposed portion of the region of the vehicle interior refers to a portion of the region of the vehicle interior within a region image that is not hidden by the occupant.

Learning model storage 124 stores a learning model that has learned a correlation between the feature amount of the first region image and the orientation of the second part and a correlation between the feature amount of the second region image and the orientation of the second part. For example, learning model storage 124 may be a non-volatile storage device. For example, learning model storage 124 stores a learning model that has been generated in advance by learning model generator 232, which will be described later with reference to FIG. 7.

Orientation detector 125 detects the orientation of the first part based on the feature amounts of the first region image and the second region image that are output from image segmenter 123.

For example, orientation detector 125 detects the orientation of the first part based on the feature amounts of the first region image and the second region image, using a learning model acquired from learning model storage 124. For example, the orientation of the first part can be represented by angles, such as roll angle, pitch angle, and yaw angle.

Alternatively, orientation detector 125 detects the orientation of the first part based on the feature amounts of the first region image and the second region image, by referring to a table that has been prepared in advance. This table describes a correlation between the feature amount of the first region image and the orientation of the first part and a correlation between the feature amount of the second region image and the orientation of the first part.

Output device 130 produces an output according to the orientation of the first part that is detected by orientation detector 125. For example, output device 130 may include a loudspeaker, and when the yaw angle indicating the orientation of the first part is outside a predetermined range over a predetermined time, output device 130 may output a sound from the loudspeaker for alerting the occupant not to take eyes off the road.

Figure 2:
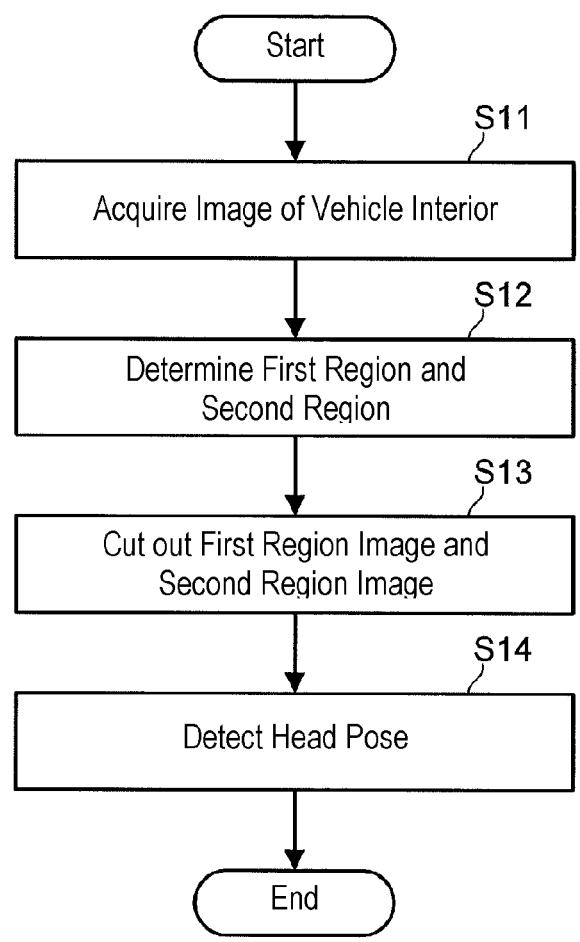
FIG. 2 is a flowchart illustrating operations of the detection device shown in FIG. 1.
Figure 3A:
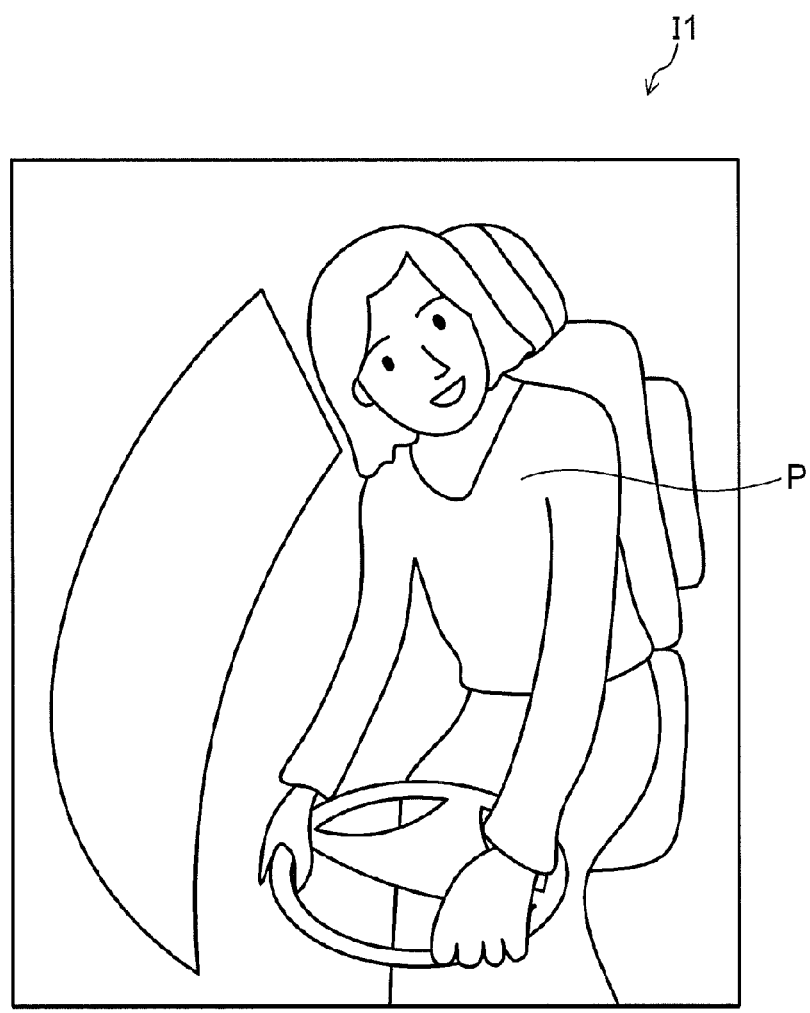
FIGS. 3A to 3C are illustrative views showing examples of the head pose of an occupant.
Figure 3B:
Figure 3C:
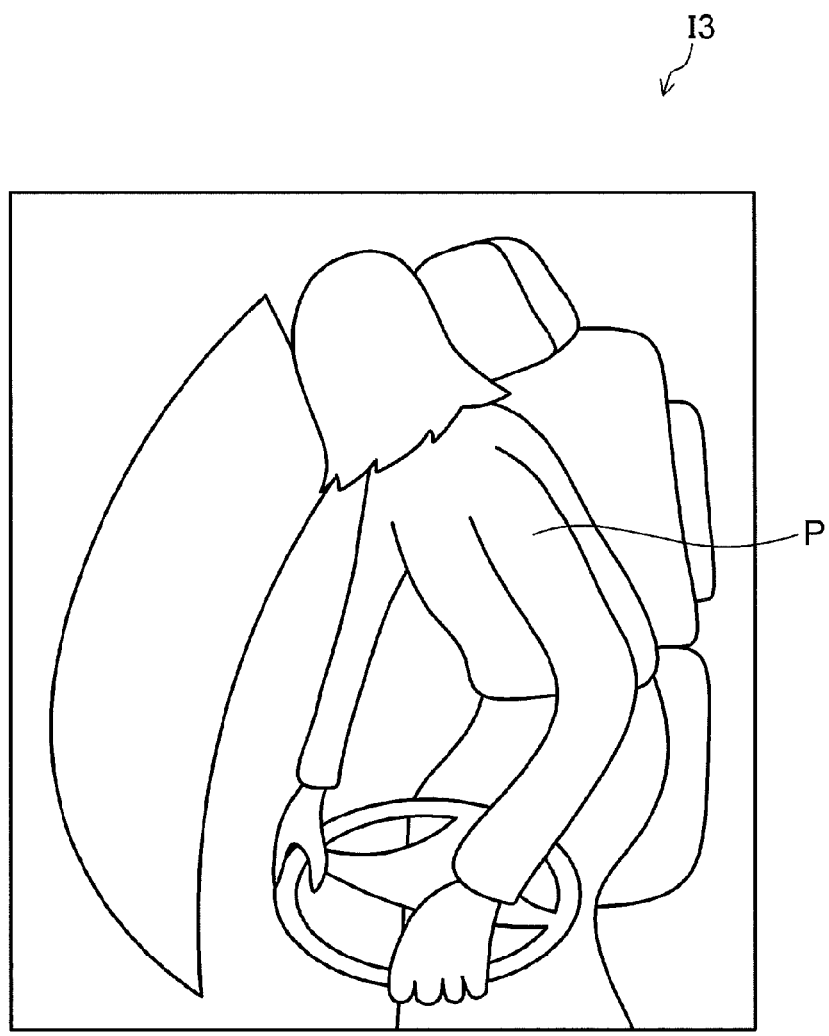
Figure 4:
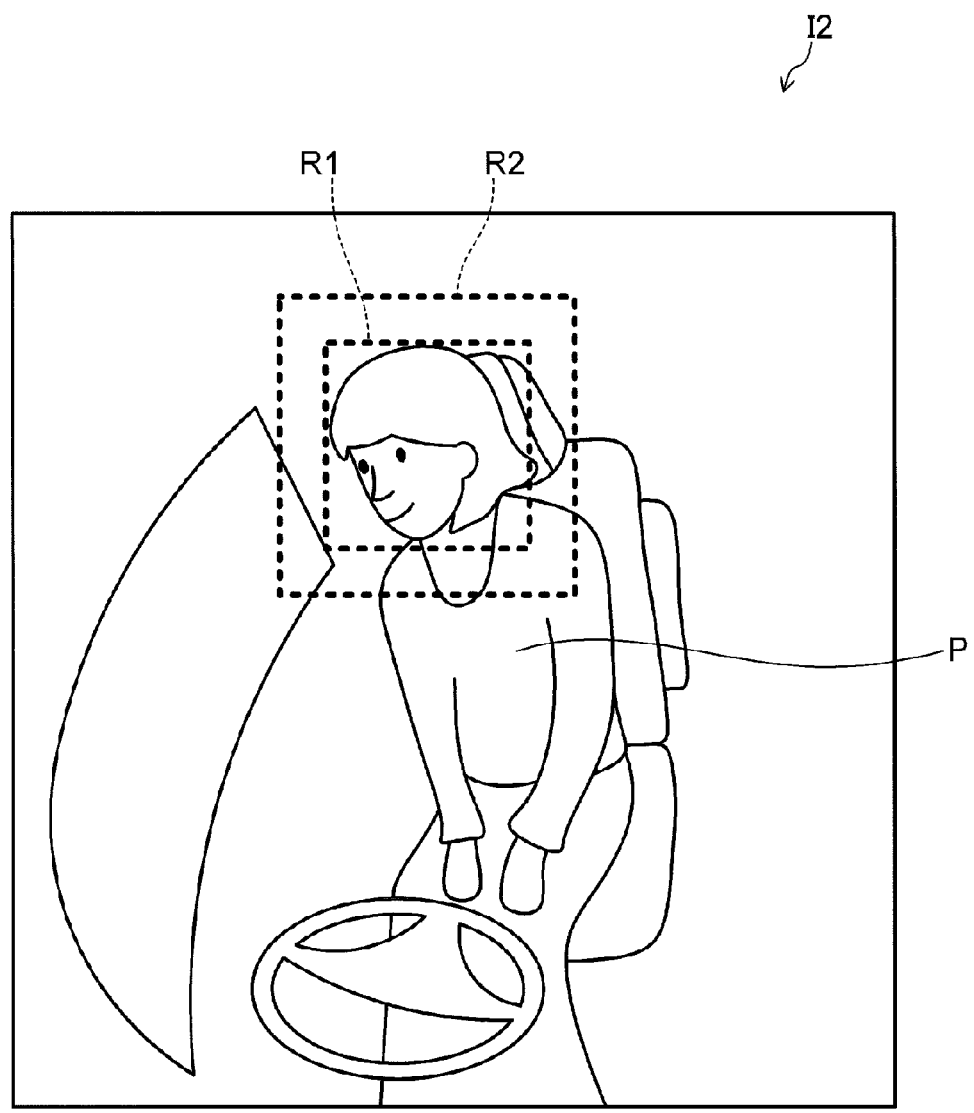
FIGS. 4 and 5 are illustrative views showing examples of a first region and a second region.
Figure 5:
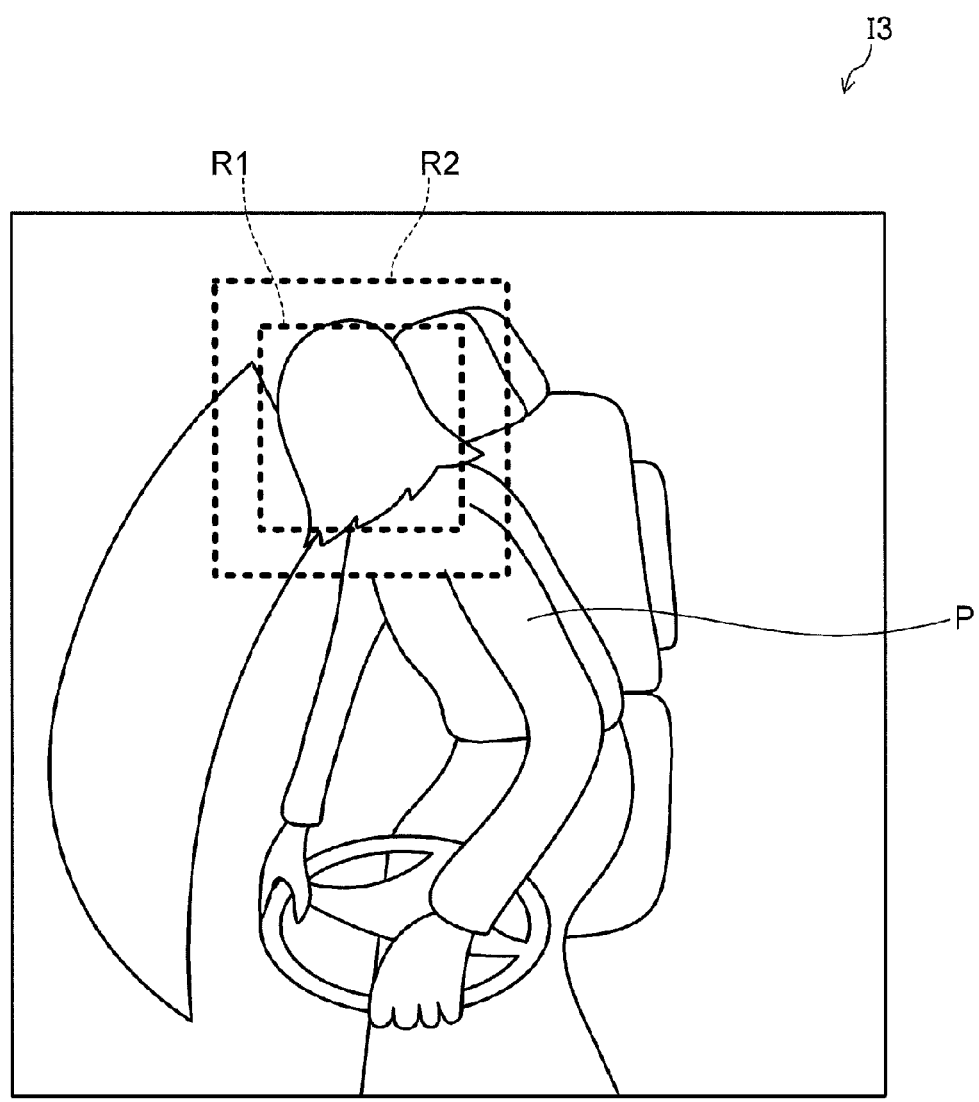
Figure 6A:
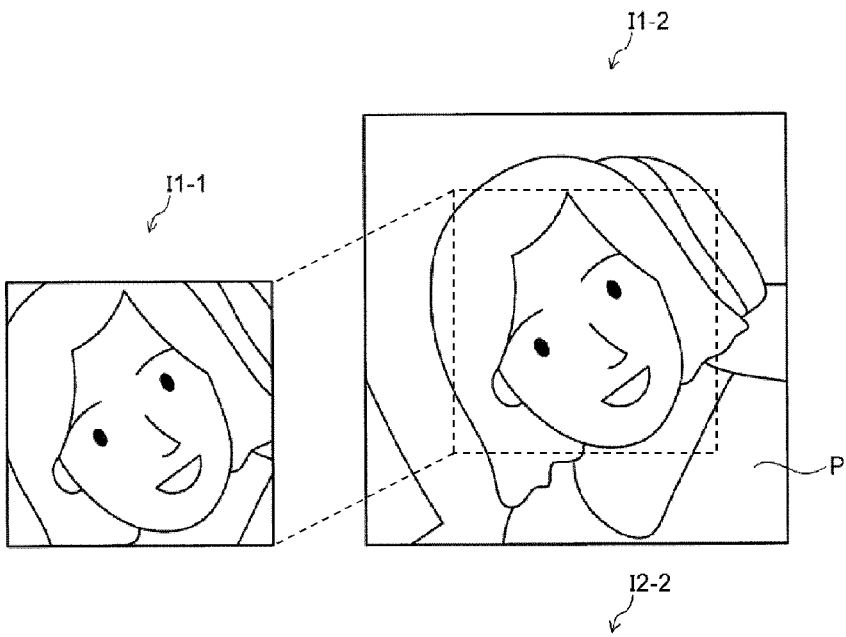
FIGS. 6A to 6C are illustrative views showing examples of a first region image and a second region image.
Figure 6B:
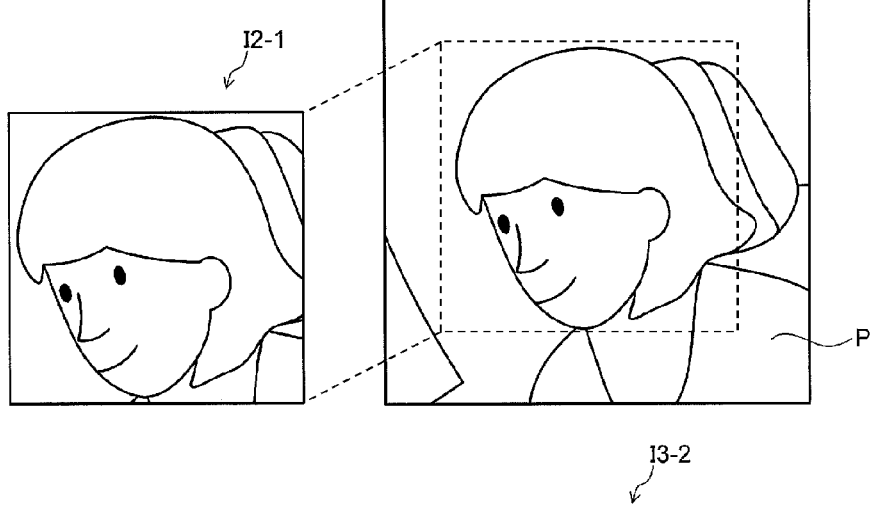
Figure 6C:
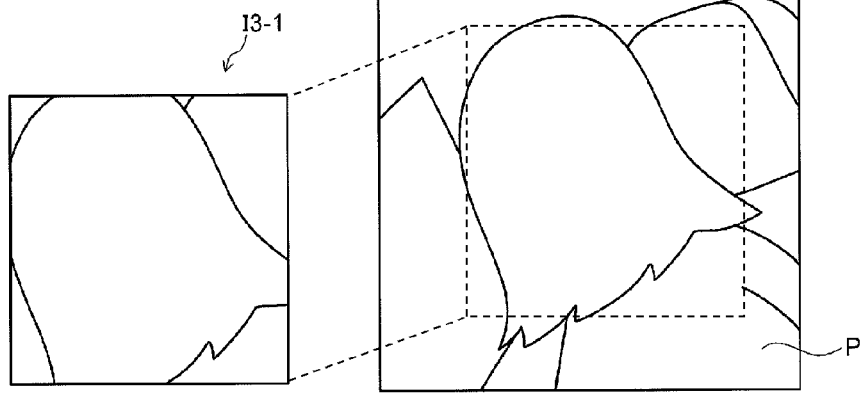

FIG. 2 is a flowchart illustrating operations of detection device 120. FIGS. 3A to 3C are illustrative views showing examples of the head pose of an occupant. FIGS. 4 and 5 are illustrative views showing examples of first region R1 and second region R2. FIGS. 6A to 6C are views showing first region images I1-1, I2-1, and I3-1 and second region images I1-2, I2-2, and I3-2, as examples of the first region image and the second region image.

The process shown in FIG. 2 is implemented, for example, by a central processing unit (CPU) of detection device 120 that periodically executes a program stored in read only memory (ROM) upon starting of the engine of the vehicle.

Note that a face or a head is taken as an example of the first part in the following description. In addition, the following description explains examples in which the head pose is represented by a yaw angle with the head pose of occupant P facing forward being taken as reference, and with the head pose of occupant P facing rightward defined as positive orientation.

In step S11, detection device 120 acquires an image of the vehicle interior from imaging device 110 (a process performed as image acquirer 121). Examples of the image of the vehicle interior are vehicle interior images I1, I2, and I3 shown in FIGS. 3A, 3B, and 3C, respectively. In vehicle interior images I1, I2, and I3, occupant P's head pose angles are −45 degrees, 0 degrees, and 120 degrees, respectively.

In step S12, detection device 120 determines first region R1 and second region R2 (a process performed as cut-out position determiner 122).

For example, first region R1 is determined based on the position at which the face of occupant P is present. For example, first region R1 may include the head of occupant P. Although it is preferable that the size and position of the head of occupant P be consistent (or constant) at all times, slight deviations are permitted.

For example, the position of first region R1 is determined so as to follow the positions of the head of occupant P in vehicle interior images I1, I2, and I3. Alternatively, first region R1 may be determined based on the range within which the head of occupant P is assumed to move, for example.

For example, first region R1 may contain the entire face of occupant P. Alternatively, for example, first region R1 may contain at least facial landmarks of occupant P that are in strong correlation with the head pose of occupant P, such as the eyes, nose, and mouth of occupant P. In this case, first region R1 does not necessarily contain the entire face of occupant P.

For example, second region R2 includes at least a portion of the region of the vehicle interior that changes its appearance in vehicle interior images I1, I2, and I3 when occupant P turns back. Such a region of the vehicle interior may be, for example, a seat, a headrest, a vehicle window, or a pillar.

The exposed portion of the seat is seen differently between when occupant P is looking forward, as illustrated in FIG. 4, and when occupant P is turning backward, as illustrated in FIG. 5. For example, when occupant P is turning rightward and backward as illustrated in FIG. 5, occupant P is twisting the body rightward. Accordingly, the area of the exposed portion of the seat in vehicle cabin image I3 is larger than that in vehicle interior image I2.

Alternatively, second region R2 may include at least a portion of the body part that changes its appearance in vehicle interior images I1, I2, and I3 when occupant P turns back. Such a body part may be, for example, the upper body of occupant P. For example, when occupant P turns rightward and backward in the interior of the vehicle, as illustrated in FIG. 3C, occupant P turns the upper body including the shoulders rightward. Accordingly, the appearance or the area of the upper body including the shoulders and so forth is different from that in the case where occupant P faces forward, as illustrated in FIG. 3B.

In the example shown in FIGS. 4 and 5, the center position of second region R2 is identical to the center position of first region R1, and second region R2 includes at least a portion of the upper body of occupant P and the seat.

The appearance of each of vehicle interior images I1, I2, and I3 also depends on, for example, the interior trim of the vehicle interior. For this reason, an appropriate region for second region R2 may be determined experimentally.

Referring back to FIG. 2, the description is continued. In step S13, detection device 120 cuts out first region images I1-1, I2-1, and I3-1 and second region images I1-2, I2-2, and I3-2 (a process performed as image segmenter 123). FIGS. 6A to 6C respectively show first region images I1-1, I2-1, and I3-1 and second region images I1-2, I2-2, and I3-2 when the occupant P's head pose angles are −45 degrees, 0 degrees, and 120 degrees, respectively.

In step S14, detection device 120 detects a head pose angle (a process performed as orientation detector 125). For example, orientation detector 125 detects the head pose angle of occupant P from the positional relationship of the facial landmarks of occupant P in each of first region images I1-1, I2-1, and I3-1 and the areas of the exposed portion of the seat in each of second region images I1-2, I2-2, and I3-2, using the learning model acquired from learning model storage 124.

As illustrated in FIGS. 6A to 6C, in first region images I1-1, I2-1, and I3-1, the greater the head pose angle of occupant P, the less the facial landmarks of occupant P that can be seen. On the other hand, in second region images I1-2, I2-2, and I3-2, the greater the head pose angle of occupant P, the larger the area of the exposed portion of the seat.

For example, when the head pose angle changes as shown from FIG. 6A to FIG. 6B, the distance between the eyes gradually becomes narrower as the head pose angle of the occupant changes, as seen in first region images I1-1 and I2-1. Thus, the correlation between the feature amount of the first region image and the head pose angle of occupant P is strong. On the other hand, as seen in second region images I1-2 and I2-2, the area of the exposed portion of the seat barely changes even when the head pose angle of the occupant changes. Thus, the correlation between the feature amount of the second region image and the head pose angle of occupant P is weak.

Therefore, as long as the learning model sufficiently reflects the correlation between the feature amounts of the first region image and the head pose angle of occupant P, detection device 120 is able to successfully detect the head pose angle that changes as shown in FIGS. 6A and 6B.

Moreover, for example, when the head pose angle changes as shown from FIG. 6B to FIG. 6C, the area of the exposed portion of the seat, for example, increases, as seen in second region images I2-2 and I3-2. That is, the correlation between the feature amount of the second region image and the head pose angle of occupant P is strong. On the other hand, the facial landmarks of occupant P disappear from sight, as seen in first region images I2-1 and I3-1. For example, when the facial landmarks of occupant P are hidden and only the hair of the head can be seen in the first region image, a great difference in the feature amount does not arise in the first region image even though the head pose angle changes. That is, the correlation between the feature amount of the first region image and the head pose angle of occupant P is weak.

Therefore, as long as the learning model sufficiently reflects the correlation between the feature amount of the second region image and the head pose angle of occupant P, detection device 120 is able to successfully detect the head pose angle that changes as shown from FIG. 6B to FIG. 6C.

As described above, in the case of transition from FIG. 6A to FIG. 6B, the correlation between the feature amount of the first region image and the head pose angle of occupant P is strong, but the correlation between the feature amount of the second region image and the head pose angle of occupant P is weak. On the other hand, in the case of transition from FIG. 6B to FIG. 6C, the correlation between the feature amount of the first region image and the head pose angle of occupant P is weak, but the correlation between the feature amount of the second region image and the head pose angle of occupant P is strong. Thus, the correlation strength between the feature amount of the first region image and the orientation of the first part and the correlation strength between the feature amount of the second region image and the orientation of the first part are in a complementary relationship with each other.

As will be described later with reference to FIGS. 7 and 8, the learning model according to the present exemplary embodiment preferentially learns a stronger one of the correlation between the head pose angle of occupant P and the positional relationship of facial landmarks (first part) of occupant P with respect to the imaging device and the correlation between the head pose angle of occupant P and the area of the exposed portion of the seat, and sufficiently reflects the stronger one of the correlations. Specifically, when the face of occupant P is seen clearly, the correlation between the head pose angle and the positional relationship of facial landmarks is learned preferentially. On the other hand, when the face of occupant P is not clearly seen, the correlation between the head pose angle of occupant P and the area of the exposed portion of the seat is learned preferentially. Therefore, detection device 120 is able to accurately detect the head pose angle using the same learning model, that is, the same process contents, irrespective of the orientation of occupant P.

As described above, detection device 120 includes image segmenter 123 and orientation detector 125. Image segmenter 123 cuts out first region images I1-1, I2-1, and I3-1 and second region images I1-2, I2-2, and I3-2 from the images of the vehicle interior acquired from imaging device 110. Each of first region images I1-1, I2-1, and I3-1 shows at least a portion of the first part of the body of occupant P. Each of second region images I1-2, I2-2, and I3-2 shows at least a portion of the region of the vehicle interior around the first part, or at least a portion of the second part of the body of occupant P. Orientation detector 125 detects the orientation of the first part of the body of occupant P based on the feature amounts of first region images I1-1, I2-1, and I3-1 and the feature amounts of second region images I1-2, I2-2, and I3-2.

Detection device 120 is able to accurately detect the orientation of a body part of occupant P who carries out a turn-back action.

Moreover, detection device 120 does not need to calculate angular velocity that indicates the movement of a body part, and detection device 120 can calculate the orientation of the body part in a stable manner.

(Configuration and Operation of Orientation Learning System 200)

Figure 7:
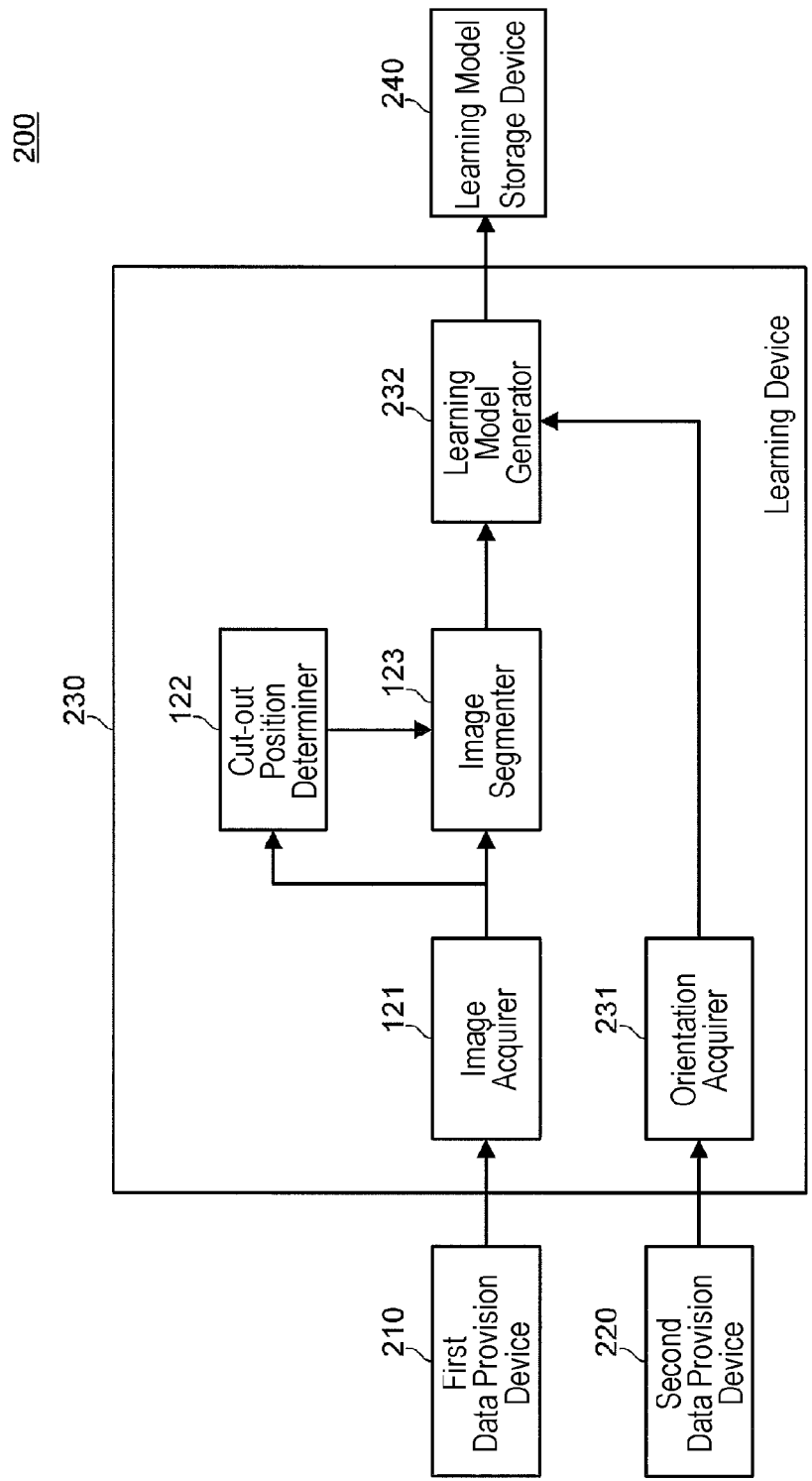
FIG. 7 is a functional block diagram illustrating the configuration of an orientation learning system including a learning device according to an exemplary embodiment of the present disclosure.

FIG. 7 is a configuration diagram of orientation learning system 200 according to the present exemplary embodiment. Orientation learning system 200 includes first data provision device 210, second data provision device 220, learning device 230, and learning model storage device 240.

First data provision device 210 provides an image of a vehicle interior, used for learning in learning model generator 232, as image data of the vehicle interior to learning device 230. For example, first data provision device 210 includes a storage (not shown) that stores the image data of the vehicle interior temporarily. Subsequently, first data provision device 210 provides the image data of the vehicle interior acquired from the storage to learning device 230.

Second data provision device 220 provides an orientation of the second part, used for learning in learning model generator 232, as orientation data to learning device 230. For example, second data provision device 220 includes a storage (not shown) that stores the orientation data temporarily. Subsequently, second data provision device 220 provides the orientation data acquired from the storage to learning device 230.

The orientation of the second part indicated by the orientation data corresponds to the actual orientation of the second part of the occupant's body, which is contained in the image of the vehicle interior indicated by the image data of the vehicle interior. For example, when vehicle interior images I1, I2, and I3 respectively shown in FIGS. 3A, 3B, and 3C are used for learning, the head pose angles −45 degrees, 0 degrees, and 120 degrees that are indicated by the orientation data respectively correspond to vehicle interior images I1, I2, and I3 indicated by the respective image data of the vehicle interior. Generally, the image of the vehicle interior acquired by detection device 120 shown in FIG. 1 is different from the image of the vehicle interior acquired by learning device 230 containing a different occupant. However, the present exemplary embodiment makes use of vehicle interior images I1, I2, and I3 for describing learning device 230 although images I1, I2, and I3 are used in describing detection device 120.

For example, the image data of the vehicle interior and orientation data used for learning are prepared before learning device 230 is operated.

For example, the occupant puts an orientation sensor, such as a gyroscope sensor, on the second part of the body of the occupant. Subsequently, the orientation sensor measures the orientation of the second part at the same time as an imaging device (not shown) takes an image of the vehicle interior containing the occupant. Subsequently, image data of the vehicle interior indicating the acquired image of the vehicle interior is produced and stored in the storage of first data provision device 210. Meanwhile, orientation data indicating the acquired orientation of the second part are produced and stored in the storage of second data provision device 220.

Alternatively, the imaging device (not shown) takes an image of the vehicle interior containing an occupant who is placing his/her second part in a given orientation. Subsequently, image data of the vehicle interior indicating the acquired image of the vehicle interior is produced and stored in the storage of first data provision device 210. Meanwhile, orientation data indicating the given orientation is produced and stored in the storage of second data provision device 220.

Learning device 230 learns a correlation between the image of the vehicle interior provided by first data provision device 210 and the orientation of the second part provided by second data provision device 220. The second part may be, for example, a face. Learning device 230 includes image acquirer 121, cut-out position determiner 122, image segmenter 123, orientation acquirer 231, and learning model generator 232.

Image acquirer 121 is identical to the one provided for detection device 120 shown in FIG. 1 except that the source of acquisition of the image of the vehicle interior is different, so further description thereof will be omitted. In addition, the functions of cut-out position determiner 122 and image segmenter 123 are also identical to those of cut-out position determiner 122 and image segmenter 123 provided in detection device 120, so further description thereof will be omitted.

Orientation acquirer 231 acquires data indicating the orientation of the second part from second data provision device 220, and outputs the orientation of the second part to learning model generator 232.

Learning model generator 232 generates a learning model that learns correlation between the orientation of the second part output from orientation acquirer 231 and the feature amount of the first region image and correlation between the orientation of the second part and the feature amount of the second region image. The feature amount of the first region image and the feature amount of the second region image are acquired from image segmenter 123. The technique for generating the learning model may be, for example, a convolutional neural network (CNN).

Learning model storage device 240 stores the learning model generated by learning model generator 232. For example, a duplicate of the learning model stored in learning model storage device 240 is stored in learning model storage 124 shown in FIG. 1. The learning model is generated in advance, and stored in learning model storage 124 of detection device 120 at the time of shipment of the vehicle.

Figure 8:
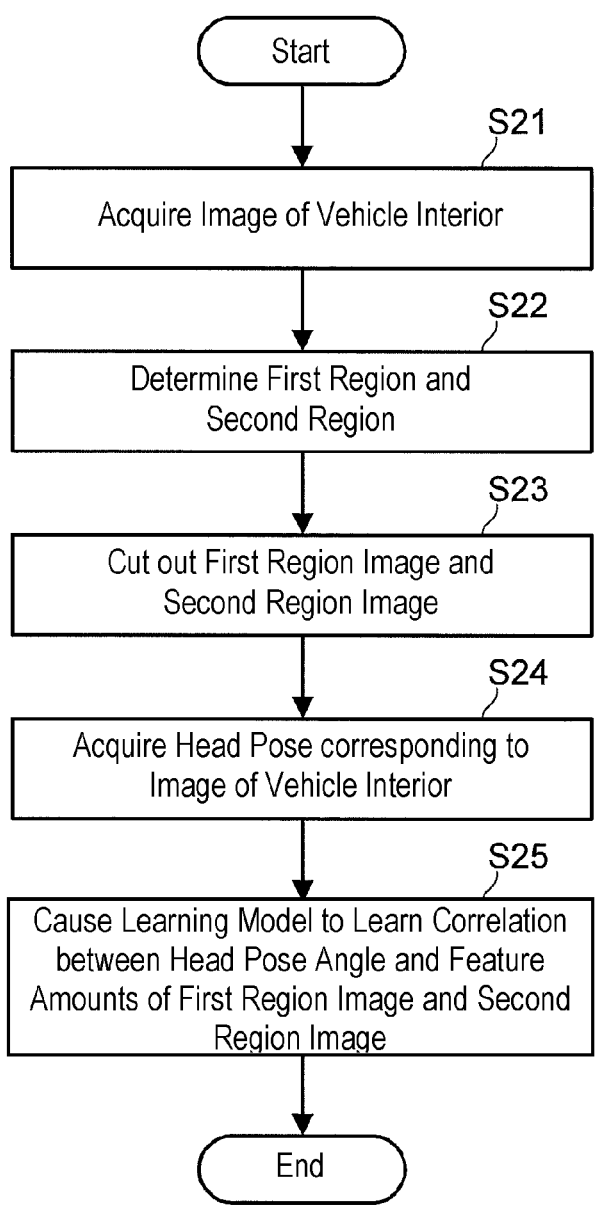
FIG. 8 is a flowchart illustrating operations of the learning device shown in FIG. 7.

FIG. 8 is a flowchart illustrating operations of learning device 230. This process is implemented by a CPU of learning device 230 reading and executing a program stored in a ROM. Note that, in the following description, a face or a head is taken as an example of the first part, and a seat is taken as an example of the region of the vehicle interior.

In step S21, learning device 230 acquires an image of the vehicle interior from first data provision device 210 (a process performed as image acquirer 121). Examples of the image of the vehicle interior to be acquired are vehicle interior images I1, I2, and I3 shown in FIGS. 3A, 3B, and 3C, respectively.

In step S22, learning device 230 determines first region R1 and second region R2 (a process performed as cut-out position determiner 122). In step S23, learning device 230 cuts out first region images I1-1, I2-1, and I3-1 and second region images I1-2, I2-2, and I3-2 (a process performed as image segmenter 123). The contents of the processes in steps S22 and S23 are the same as those in steps S12 and S13 shown in FIG. 2, and therefore the descriptions thereof are omitted. In particular, both detection device 120 and learning device 230 determine the first region and the second region in the same manner.

In step S24, learning device 230 acquires a head pose angle corresponding to the image of the vehicle interior from second data provision device 220 (a process performed as orientation acquirer 231). Examples of the head pose angle to be acquired are −45 degrees, 0 degrees, and 120 degrees, which are the head pose angles in vehicle interior images I1, I2, and I3, respectively.

In step S25, learning device 230 causes the learning model to learn correlation of the head pose angles with the feature amounts of first region images I1-1, I2-1, and I3-1 and correlation of the head pose angles with the feature amounts of second region images I1-2, I2-2, and I3-2 (a process performed as learning model generator 232).

For example, when the head pose angle changes as shown from FIG. 6A to FIG. 6B, the facial landmarks of occupant P are visible in first region images I1-1 and I2-1. Thus, the correlation between the positional relationship of the facial landmarks of occupant P and the head pose angle of occupant P is strong. On the other hand, in second region images I1-2 and I2-2, the area of the exposed portion of the seat does not change greatly. Thus, the correlation between the positional relationship of the facial landmarks of occupant P, which is one of the feature amounts, and the head pose angle of occupant P, is learned preferentially and reflected sufficiently in the generated learning model.

Moreover, for example, when the head pose angle changes as shown from FIG. 6B to FIG. 6C, the area of the exposed portion of the seat increases from second region image I2-2 to second region image I3-2. Thus, the correlation between the area of the exposed portion of the seat and the head pose angle of occupant P is strong. On the other hand, the facial landmarks of occupant P are completely invisible in first region image I3-1 shown in FIG. 6C. Thus, the correlation between the area of the exposed portion of the seat, which is another one of the feature amounts, and the head pose angle of occupant P, is learned preferentially and reflected sufficiently in the generated learning model.

By following the flowchart shown in FIG. 8, a learning model is generated that is to be used for head pose detection by orientation detector 125 of detection device 120 shown in FIG. 1.

As described above, learning device 230 includes image segmenter 123 and learning model generator 232. Image segmenter 123 cuts out first region images I1-1, I2-1, and I3-1 and second region images I1-2, I2-2, and I3-2 from the images of the vehicle interior acquired from first data provision device 210. Each of first region images I1-1, I2-1, and I3-1 shows at least a portion of the first part of the body of occupant P. Each of second region images I1-2, I2-2, and I3-2 shows at least a portion of the region of the vehicle interior around the first part, or at least a portion of the second part of the body of the occupant. Learning model generator 232 generates a learning model that learns a correlation between the orientations of the second part acquired from second data provision device 220 and the feature amounts of first region images I1-1, I2-1, and I3-1 and a correlation between the orientations of the second part and the feature amounts of second region images I1-2, I2-2, and I3-2.

By using the learning model produced by learning device 230, detection device 120 is able to accurately detect the orientation of a body part of occupant P who carries out a turn-back action.

Moreover, with the learning model produced by learning device 230, detection device 120 is able to accurately detect the orientation of a body part of occupant P even when the body part is not contained in the images of the vehicle interior.

Furthermore, with the learning model produced by learning device 230, detection device 120 does not need to calculate angular velocity that indicates the movement of the body part, so that detection device 120 can calculate the orientation of the body part in a stable manner.

Modification Examples of Orientation Learning System 200

In the above-described orientation learning system 200, first data provision device 210 and second data provision device 220 are composed of separate component parts. Alternatively, it is possible that first data provision device 210 and second data provision device 220 may be composed of an integrated component part. In this case, the first data provision device and the second data provision device are composed of a single data provision device that outputs the image data of the vehicle interior and the data indicating the orientation of the second part to learning device 230.

In the above-described orientation learning system 200, first data provision device 210 and second data provision device 220 provide the image of the vehicle interior and the orientation data that are stored in their respective storages. Alternatively, it is possible that imaging device 110 shown in FIG. 1 may be used as first data provision device 210, and that second data provision device 220 may be an orientation sensor that is placed on the first part of the body of the occupant.

Figure 9:
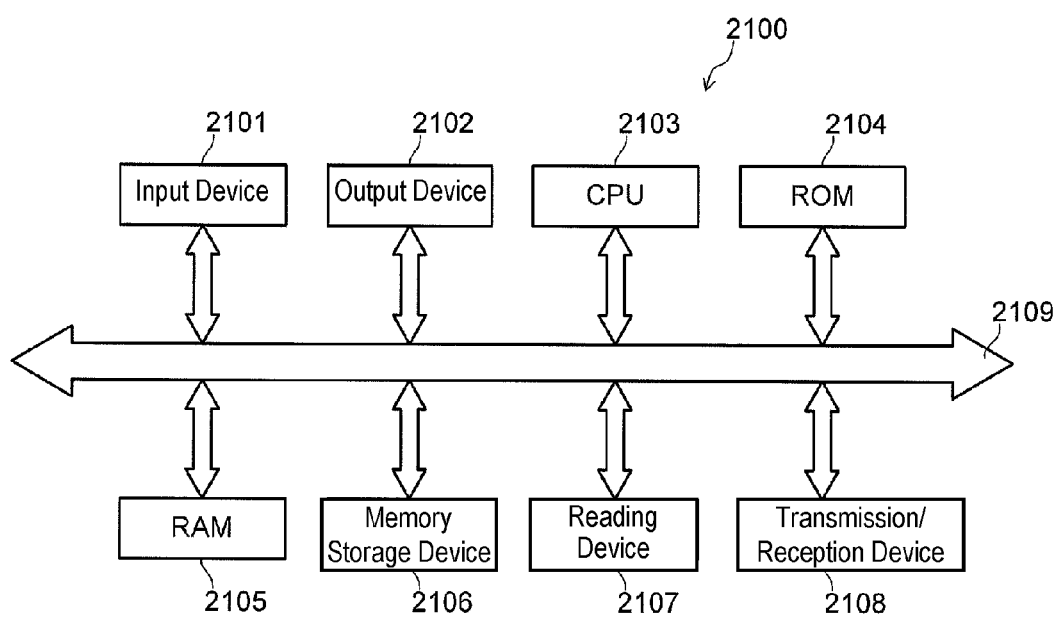
FIG. 9 is a view illustrating an example of a hardware configuration of a computer for the detection device shown in FIG. 1 and the learning device shown in FIG. 1.

FIG. 9 is a view illustrating an example of a hardware configuration of a computer for detection device 120 or learning device 230 (or, orientation detection system 100 or orientation learning system 200). The functions of the components in the exemplary embodiments and modification examples described above may be implemented by a program executed by computer 2100.

As illustrated in FIG. 9, computer 2100 includes input device 2101, output device 2102, CPU 2103, ROM 2104, and random access memory (RAM) 2105. Input device 2100 may include input buttons, a touchpad, or the like, and output device 2102 may include a display, a loudspeaker, or the like. Computer 2100 includes memory storage device 2106, reading device 2107, and transmission/reception device 2108. Memory storage device 2106 may be a device such as a hard disk device and a solid state drive, and reading device 2107 reads information from a recording medium, such as a digital versatile disk read-only memory (DVD-ROM) and a universal serial bus (USB) memory. Transmission/reception device 2108 communicates with, for example, a server device (not shown) via a network. The above-described components are connected via bus 2109.

Reading device 2107 reads a program for implementing the functions of the components from a recording medium that records (stores) the program, and causes memory storage device 2106 to store the program. Alternatively, transmission/reception device 2108 communicates with the server device connected to the network, and causes memory storage device 2106 to store the program for implementing the functions of the above-described various components that is downloaded from the server device.

Then, CPU 2103 copies the program stored in memory storage device 2106 into RAM 2105, sequentially reads out the instructions contained in the program from RAM 2105, and executes the instructions, to implement the functions of the above-described components. Also, when executing the program, RAM 2105 or memory storage device 2106 stores information obtained in the various processes described in the various exemplary embodiments, so that the information can be utilized as needed.

Other than configuring various components of detection device 120 and learning device 230 by general-purpose hardware and software (programs) as described above, the various components may be configured by dedicated circuits.

As described above, a detection device, a learning device, a detection method, a learning method, and a recording medium according to the present disclosure may be applied suitably to vehicles.

What is claimed is:

1. A detection device comprising:
    an image segmenter configured to cut out, from one image of a vehicle interior acquired from an imaging device, a first region image showing at least a portion of a first part of a body of an occupant, and a second region image from said one image showing at least a portion of a region of the vehicle interior around the first part; and
    a detector configured to detect an orientation of the first part of the body of the occupant based on a feature amount of the first region image and a feature amount of the second region image,
    wherein the first part is a face or a head of the occupant, and the feature amount of the first region image is a positional relationship between facial landmarks of the occupant,
    wherein the region of the vehicle interior is at least one of a seat, a headrest, a vehicle window, and a pillar, and
    wherein a correlation strength between the feature amount of the first region image and the orientation of the first part and a correlation strength between the feature amount of the second region image and the orientation of the first part are in a complementary relationship by a learning model.

2. The detection device according to claim 1, wherein the feature amount of the second region image is an area of an exposed portion of the region of the vehicle interior.

3. A learning device comprising:
    an image segmenter configured to cut out, from one image of a vehicle interior acquired from a first data provision device, a first region image showing at least a portion of a first part of a body of an occupant, and a second region image from said one image showing at least a portion of a region of the vehicle interior around the first part; and
    a learning model generator configured to generate a learning model that learns a correlation between an orientation of the second part acquired from a second data provision device and a feature amount of the first region image and a correlation between the orientation of the second part acquired from the second data provision device and a feature amount of the second region image,
    wherein the first part is a face or a head of the occupant, and the feature amount of the first region image is a positional relationship between facial landmarks of the occupant,
    wherein the region of the vehicle interior is at least one of a seat, a headrest, a vehicle window, and a pillar, and
    wherein a correlation strength between the feature amount of the first region image and an orientation of the first part and a correlation strength between the feature amount of the second region image and the orientation of the first part are in a complementary relationship by a learning model.

4. A detection method performed by a detection device, the detecting method comprising:
    cutting out, from one image of a vehicle interior acquired from an imaging device, a first region image showing at least a portion of a first part of a body of an occupant, and a second region image from said one image showing at least a portion of a region of the vehicle interior around the first part; and
    detecting an orientation of the first part of the body of the occupant based on a feature amount of the first region image and a feature amount of the second region image,
    wherein the first part is a face or a head of the occupant, and the feature amount of the first region image is a positional relationship between facial landmarks of the occupant,
    wherein the region of the vehicle interior is at least one of a seat, a headrest, a vehicle window, and a pillar, and
    wherein a correlation strength between the feature amount of the first region image and the orientation of the first part and a correlation strength between the feature amount of the second region image and the orientation of the first part are in a complementary relationship by a learning model.

5. A learning method performed by a learning device, the learning method comprising:
   cutting out, from one image of a vehicle interior acquired from a first data provision device, a first region image showing at least a portion of a first part of a body of an occupant, and a second region image from said one image showing at least a portion of a region of the vehicle interior around the first part; and
   generating a learning model that learns a correlation between an orientation of the second part acquired from a second data provision device and a feature amount of the first region image and a correlation between the orientation of the second part acquired from the second data provision device and a feature amount of the second region image,
   wherein the first part is a face or a head of the occupant, and the feature amount of the first region image is a positional relationship between facial landmarks of the occupant,
   wherein the region of the vehicle interior is at least one of a seat, a headrest, a vehicle window, and a pillar, and
   wherein a correlation strength between the feature amount of the first region image and an orientation of the first part and a correlation strength between the feature amount of the second region image and the orientation of the first part are in a complementary relationship by a learning model.

6. A non-transitory recording medium storing a detection program to be executed by a computer included in a detection device, the detection program causing the computer to execute:
   a process of cutting out, from one image of a vehicle interior acquired from an imaging device, a first region image showing at least a portion of a first part of a body of an occupant, and a second region image from said one image showing at least a portion of a region of the vehicle interior around the first part; and
   a process of detecting an orientation of the first part of the body of the occupant based on a feature amount of the first region image and a feature amount of the second region image,
   wherein the first part is a face or a head of the occupant, and the feature amount of the first region image is a positional relationship between facial landmarks of the occupant,
   wherein the region of the vehicle interior is at least one of a seat, a headrest, a vehicle window, and a pillar, and
   wherein a correlation strength between the feature amount of the first region image and the orientation of the first part and a correlation strength between the feature amount of the second region image and the orientation of the first part are in a complementary relationship by a learning model.

7. A non-transitory recording medium storing a learning program to be executed by a computer included in a learning device, the learning program causing the computer to execute:
   a process of cutting out, from one image of a vehicle interior acquired from a first data provision device, a first region image showing at least a portion of a first part of a body of an occupant, and a second region image from said one image showing at least a portion of a region of the vehicle interior around the first part; and
   a process of generating a learning model that learns a correlation between an orientation of the second part acquired from a second data provision device and a feature amount of the first region image and a correlation between the orientation of the second part acquired from the second data provision device and a feature amount of the second region image,
   wherein the first part is a face or a head of the occupant, and the feature amount of the first region image is a positional relationship between facial landmarks of the occupant,
   wherein the region of the vehicle interior is at least one of a seat, a headrest, a vehicle window, and a pillar, and
   wherein a correlation strength between the feature amount of the first region image and an orientation of the first part and a correlation strength between the feature amount of the second region image and the orientation of the first part are in a complementary relationship by a learning model.

8. A detection device comprising:
   an image segmenter configured to cut out, from one image of a vehicle interior acquired from an imaging device, a first region image showing at least a portion of a first part of a body of an occupant, and a second region image from said one image showing at least a portion of a second part of the body of the occupant that does not include the first part; and
   a detector configured to detect an orientation of the first part of the body of the occupant based on a feature amount of the first region image and a feature amount of the second region image,
   wherein the first part is a face or a head of the occupant, and the feature amount of the first region image is a positional relationship between facial landmarks of the occupant,
   wherein the second part is one of a shoulder, a chest, and an upper body, and
   wherein a correlation strength between the feature amount of the first region image and the orientation of the first part and a correlation strength between the feature amount of the second region image and the orientation of the first part are in a complementary relationship by a learning model.

9. The detection device according to claim 8, wherein the feature amount of the second region image is an area of the second part in the second region image.

10. A learning device comprising:
    an image segmenter configured to cut out, from one image of a vehicle interior acquired from a first data provision device, a first region image showing at least a portion of a first part of a body of an occupant, and a second region image from said one image showing at least a portion of a second part of the body of the occupant that does not include the first part; and
    a learning model generator configured to generate a learning model that learns a correlation between an orientation of the second part acquired from a second data provision device and a feature amount of the first region image and a correlation between the orientation of the second part acquired from the second data provision device and a feature amount of the second region image,
    wherein the first part is a face or a head of the occupant, and the feature amount of the first region image is a positional relationship between facial landmarks of the occupant,
    wherein the second part is one of a shoulder, a chest, and an upper body, and
    wherein a correlation strength between the feature amount of the first region image and an orientation of the first part and a correlation strength between the feature amount of the second region image and the orientation of the first part are in a complementary relationship by a learning model.

11. A detection method performed by a detection device, the detecting method comprising:
cutting out, from one image of a vehicle interior acquired from an imaging device, a first region image showing at least a portion of a first part of a body of an occupant, and a second region image from said one image showing at least a portion of a second part of the body of the occupant that does not include the first part; and
detecting an orientation of the first part of the body of the occupant based on a feature amount of the first region image and a feature amount of the second region image,
wherein the first part is a face or a head of the occupant, and the feature amount of the first region image is a positional relationship between facial landmarks of the occupant,
wherein the second part is one of a shoulder, a chest, and an upper body, and
wherein a correlation strength between the feature amount of the first region image and the orientation of the first part and a correlation strength between the feature amount of the second region image and the orientation of the first part are in a complementary relationship by a learning model.

12. A learning method performed by a learning device, the learning method comprising:
cutting out, from one image of a vehicle interior acquired from a first data provision device, a first region image showing at least a portion of a first part of a body of an occupant, and a second region image from said one image showing at least a portion of a second part of the body of the occupant that does not include the first part; and
generating a learning model that learns a correlation between an orientation of the second part acquired from a second data provision device and a feature amount of the first region image and a correlation between the orientation of the second part acquired from the second data provision device and a feature amount of the second region image,
wherein the first part is a face or a head of the occupant, and the feature amount of the first region image is a positional relationship between facial landmarks of the occupant,
wherein the second part is one of a shoulder, a chest, and an upper body, and
wherein a correlation strength between the feature amount of the first region image and an orientation of the first part and a correlation strength between the feature amount of the second region image and the orientation of the first part are in a complementary relationship by a learning model.

13. A non-transitory recording medium storing a detection program to be executed by a computer included in a detection device, the detection program causing the computer to execute:
a process of cutting out, from one image of a vehicle interior acquired from an imaging device, a first region image showing at least a portion of a first part of a body of an occupant, and a second region image from said one image showing at least a portion of a second part of the body of the occupant that does not include the first part; and
a process of detecting an orientation of the first part of the body of the occupant based on a feature amount of the first region image and a feature amount of the second region image,
wherein the first part is a face or a head of the occupant, and the feature amount of the first region image is a positional relationship between facial landmarks of the occupant,
wherein the second part is one of a shoulder, a chest, and an upper body, and
wherein a correlation strength between the feature amount of the first region image and the orientation of the first part and a correlation strength between the feature amount of the second region image and the orientation of the first part are in a complementary relationship by a learning model.

14. A non-transitory recording medium storing a learning program to be executed by a computer included in a learning device, the learning program causing the computer to execute:
a process of cutting out, from one image of a vehicle interior acquired from a first data provision device, a first region image showing at least a portion of a first part of a body of an occupant, and a second region image from said one image showing at least a portion of a second part of the body of the occupant that does not include the first part; and
a process of generating a learning model that learns a correlation between an orientation of the second part acquired from a second data provision device and a feature amount of the first region image and a correlation between the orientation of the second part acquired from the second data provision device and a feature amount of the second region image,
wherein the first part is a face or a head of the occupant, and the feature amount of the first region image is a positional relationship between facial landmarks of the occupant,
wherein the second part is one of a shoulder, a chest, and an upper body, and
wherein a correlation strength between the feature amount of the first region image and an orientation of the first part and a correlation strength between the feature amount of the second region image and the orientation of the first part are in a complementary relationship by a learning model.

* * * * *